Oct. 27, 1925.

K. BAUMANN

FLEXIBLE COUPLING

Filed Dec. 4, 1922

1,558,576

Karl Baumann
INVENTOR

BY D. C. Davis
ATTORNEY

Patented Oct. 27, 1925.

1,558,576

UNITED STATES PATENT OFFICE.

KARL BAUMANN, OF URMSTON, ENGLAND, ASSIGNOR, BY MESNE ASSIGNMENTS, TO WESTINGHOUSE ELECTRIC AND MANUFACTURING COMPANY, OF EAST PITTSBURGH, PENNSYLVANIA, A CORPORATION OF PENNSYLVANIA.

FLEXIBLE COUPLING.

Application filed December 4, 1922. Serial No. 604,924.

*To all whom it may concern:*

Be it known that I, KARL BAUMANN, a citizen of the Confederation of Switzerland, and a resident of Urmston, in the county of Lancaster, England, have invented a new and useful Improvement in Flexible Couplings, of which the following is a specification.

This invention relates to flexible couplings, particularly such as are adapted for the transmission of large powers as for instance from a turbine shaft to the shaft of an electric generator driven thereby.

The object of the invention is to provide an improved coupling which will have sufficient strength and torsional rigidity to transmit the maximum load for which it is designed and sufficient transverse flexibility to compensate for small errors in alignment of the shafts which it couples.

In accordance with the invention the improved coupling is made in one piece and in its simplest form comprises end coupling members or flanges united by a rectilinear frame the centre of which coincides with the axis of the coupling and the corners of which are connected alternately with said end coupling members. A plurality of such frames may however be provided between the end coupling members in which case if there are two frames they are connected with one another and with their respective end frames at alternate corners whereas if there are more than two frames those adjacent the coupling members are connected therewith at alternate corners while each intermediate frame is connected at alternate corners with the frames at opposite sides thereof. The expression "rectilinear frame" is intended to include not only a frame in which the edges of the sides are straight but also a frame in which the sides are capable of transmitting loads by being placed in tension or compression without being subjected to any substantial bending stresses, that is to say a frame in which the longitudinal neutral axes of the sides define a substantially rectilinear figure.

Figure 2:
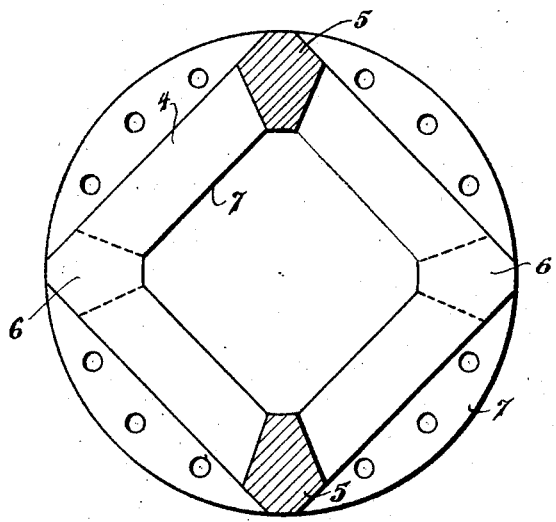
Figure 1:
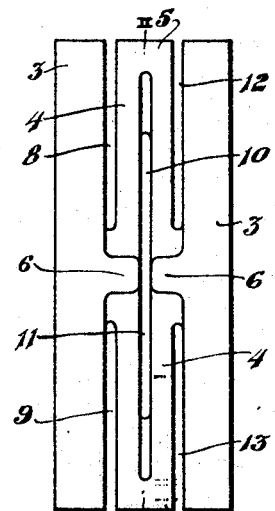

In order that the invention may be more clearly understood and readily carried into practice, reference will now be made to the accompanying drawings wherein two constructional forms thereof are illustrated by way of example; in which Fig. 1 is a view in side elevation of one embodiment of my invention; Fig. 2 is a view in section on the plane II—II of Fig. 1; and Fig. 3 is a view in side elevation of a modification of the apparatus illustrated in Fig. 1.

In the form illustrated in Figs. 1 and 2 the coupling, which as previously stated is made in one piece, comprises end flanges 3 united by two rectangular frames 4 which are connected with one another and with the end flanges 3 at alternate corners 5 and 6, respectively.

The coupling blank may be cut from a solid bar or may be rough forged to facilitate machining. It is then turned at the ends to form the flanges 3 and machined to form a square central bore 7 in the portion therebetween, the inner periphery of the flanges 3 being made either square or cylindrical as may be desired. The exterior of the portion between the flanges 3 is then machined parallel with the interior thereof and six slots 8, 9, 10, 11, 12 and 13 are cut in three transverse planes to complete the structure hereinbefore described.

Figure 3:
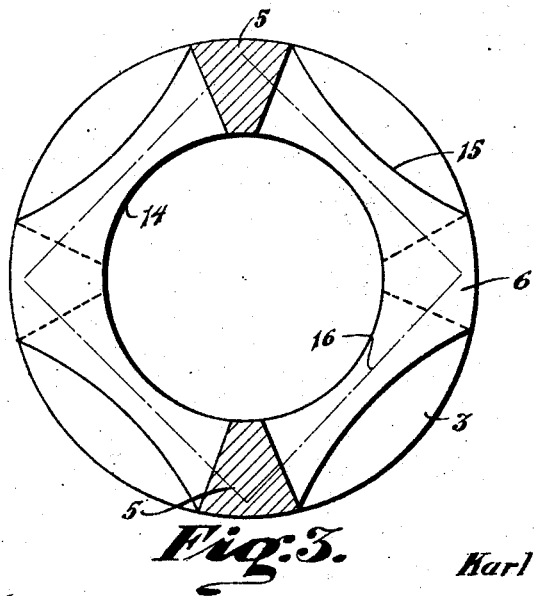

In some cases, to facilitate construction the bore of the coupling may be cylindrical, as indicated in Fig. 3, in which case the exterior surface of the portion between the flanges instead of being rectilinear is formed of a number of concave faces, indicated at 15, so that the longitudinal neutral axes of the sides of each frame 4 will define a substantially rectilinear figure, indicated at 16.

Although two constructional forms have been described by way of example, the invention is not limited to these forms but may be modified as desired within the limits imposed by the succeeding claims. In particular the number of frames 4 which are formed between the flanges 3 and the number of sides with which such frames are provided may be varied considerably.

Having now particularly described and ascertained the nature of my said invention and in what manner the same is to be performed, I declare that what I claim is:—

1. A one-piece flexible coupling comprising end coupling members united by a rectilinear frame the centre of which coincides with the axis of the coupling and the corners of which are connected alternately with said end coupling members, said frame being spaced from the end coupling members and said connecting corners being formed by a plurality of machined cuts.

2. A one-piece flexible coupling comprising end coupling members united by two rectilinear frames the centres of which coincide with the axis of the coupling and the corners of which are connected alternately with one another and with the end coupling members, said frames being spaced from the end coupling members and from each other and said connecting corners being formed by a plurality of machined cuts.

3. A one-piece flexible shaft coupling comprising end portions for connection to the shaft ends, a rectilinear frame portion disposed between and spaced from the end portions, the centre of said frame coinciding with the axis of the coupling, and corner portions connecting alternate corners of said frame with the end portions, said connecting corner portions being formed by a plurality of machined cuts.

4. A one-piece flexible shaft coupling comprising end portions for connection to the shaft ends, rectilinear frame portions disposed between and spaced from the end portions, the centres of the frames coinciding with the axis of the coupling, and corner portions connecting alternate corners of said frames with one another and with the end portions, said connecting corner portions being formed by a plurality of machined cuts.

5. A one-piece flexible shaft coupling comprising end portions and frame portions disposed therebetween, said end and frame portions having an axially disposed opening therethrough symmetrical with the coupling axis, each of said frames consisting of bands disposed in substantially rectangular form, and corner portions connecting alternate corners of said frames with one another and with the end portions, said frame portions being spaced from one another and from the end portions and said band and corner portions being formed by a plurality of machined cuts.

In testimony whereof, I have hereunto subscribed my name this seventeenth day of November 1922.

KARL BAUMANN.